United States Patent
Dick, Jr. et al.

(10) Patent No.: US 6,796,404 B1
(45) Date of Patent: Sep. 28, 2004

(54) COVER PAN ABS SENSOR

(75) Inventors: Dale R. Dick, Jr., Clawson, MI (US); Joseph M. Endreszl, Westland, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 189 days.

(21) Appl. No.: 09/533,060

(22) Filed: Mar. 22, 2000

(51) Int. Cl.[7] .............................................. F16D 66/00
(52) U.S. Cl. ......................... 188/1.11 E; 303/DIG. 6; 74/606 R
(58) Field of Search .................. 303/DIG. 6, 145; 188/1.11 R, 1.11 E; 475/230, 231, 150; 73/493, 494; 74/606 R, 606 A, 607

(56) References Cited

U.S. PATENT DOCUMENTS

| | | | |
|---|---|---|---|
| 3,769,533 A | * 10/1973 | Pauwels | 310/155 |
| 3,846,697 A | * 11/1974 | Cila et al. | 324/34 GT |
| 4,263,824 A | * 4/1981 | Mueller | 74/711 |
| 4,503,934 A | * 3/1985 | Stephanus et al. | 184/1.5 |
| 4,683,775 A | * 8/1987 | Hilker et al. | 74/710 |
| 4,724,935 A | * 2/1988 | Roper et al. | 188/181 R |
| 5,011,302 A | 4/1991 | Mott et al. | |
| 5,157,966 A | * 10/1992 | Lugosi et al. | 73/118.1 |
| 5,287,738 A | 2/1994 | Polinsky et al. | |
| 5,350,041 A | 9/1994 | Steele et al. | |
| 5,486,757 A | * 1/1996 | Easley | 324/174 |
| 5,547,042 A | * 8/1996 | Platt | 184/1.5 |
| 5,642,042 A | 6/1997 | Goossens et al. | |
| 5,658,056 A | 8/1997 | Rischen et al. | |
| 5,704,692 A | 1/1998 | Purdy et al. | |
| 5,725,316 A | 3/1998 | Barbero et al. | |
| 5,727,317 A | 3/1998 | Bekku et al. | |
| 5,906,419 A | 5/1999 | Boucher et al. | |
| D424,988 S | * 5/2000 | Rothlisberger | D12/160 |
| 6,133,729 A | * 10/2000 | Mierzwinski | 324/174 |
| 6,203,464 B1 | * 3/2001 | Ishikawa et al. | 475/150 |

* cited by examiner

*Primary Examiner*—Douglas C. Butler
*Assistant Examiner*—Bradley King
(74) *Attorney, Agent, or Firm*—Harness, Dickey & Pierce P.L.C.

(57) ABSTRACT

A driving axle assembly includes an anti-lock braking system sensor, a carrier having an opening, a differential assembly including a housing rotatably mounted to the carrier and a cover pan mounted to the carrier to enclose the opening. The cover pan includes a boss having a generally planar mounting surface with an aperture therethrough. The anti-lock braking system sensor is disposed within the aperture and coupled to the cover pan.

15 Claims, 4 Drawing Sheets

COVER PAN ABS SENSOR

BACKGROUND OF THE INVENTION

1. Field of the Invention

The present invention relates generally to driving axles for use in automotive applications and, more particularly, to a driving axle cover pan equipped with an anti-lock braking system sensor.

2. Discussion of the Related Art

Many of the vehicles currently manufactured include an anti-lock braking system to provide an operator greater vehicular control while attempting to stop on surfaces having a low coefficient of friction. One type of anti-lock brake system, commonly known as a three-wall system, utilizes three speed sensors for detecting wheel lock. Typically, a three-wall system is used in conjunction with a rear wheel drive vehicle where two of the sensors are placed on the front, nondriving wheels while the third is placed on the rear driving axle. The present invention is primarily directed to the location and mount of the third sensor on the rear driving axle.

Most rear driving axles include a differential assembly rotatably supported within an axle carrier to facilitate relative rotation between a pair of output shafts. Typically, the differential assembly includes a planetary gear set having a pair of helical side gears that are splined to the ends of axle shafts. The helical side gears are meshed with paired sets of helical pinions rotatably mounted in a differential housing. In response to speed differentiation between the output or axle shafts, the torque transmitted through meshed engagement of the side gears and of the pinions generates forces causing the differential housing to rotate at a speed intermediate to the speed of the two axle shafts. Accordingly, the rotational speed of the differential housing provides an indication of the rotational speed of each of the rear wheels. As such, a tone ring of an anti-lock braking system (ABS) may be fixed to the differential housing while a sensor is fixed to the axle carrier and disposed in an aperture therethrough to become proximately located to the tone ring.

Unfortunately, mounting the ABS sensor to the axle carrier typically requires the addition of a boss or a pad to the carrier casting and additional machining operations to mount the sensor thereon. Specifically, a milling operation is often employed to "face" the boss and provide a planar mounting pad. In addition, a hole must be drilled and subsequently tapped to create threads for mounting the sensor. Because the majority of carrier machining operations are performed within an automated machining line, the cost of adding tooling to perform the aforementioned machining operations may prove prohibitive.

Accordingly, it is an object of the present invention to minimize the cost of providing rear axle assemblies with anti-lock braking sensors.

It is another object of the present invention to reduce the number of machining operations performed on an axle carrier for an axle assembly equipped with an anti-lock braking system.

SUMMARY OF THE INVENTION

The present invention provides a driving axle assembly including an anti-lock braking system sensor, a carrier having an opening, a differential assembly having a housing rotatably mounted to the carrier and a cover pan mounted to the carrier to enclose the opening. The cover pan includes a boss having a generally planar mounting surface with an aperture therethrough. The anti-lock braking-system sensor is disposed within the aperture and coupled to the cover pan.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
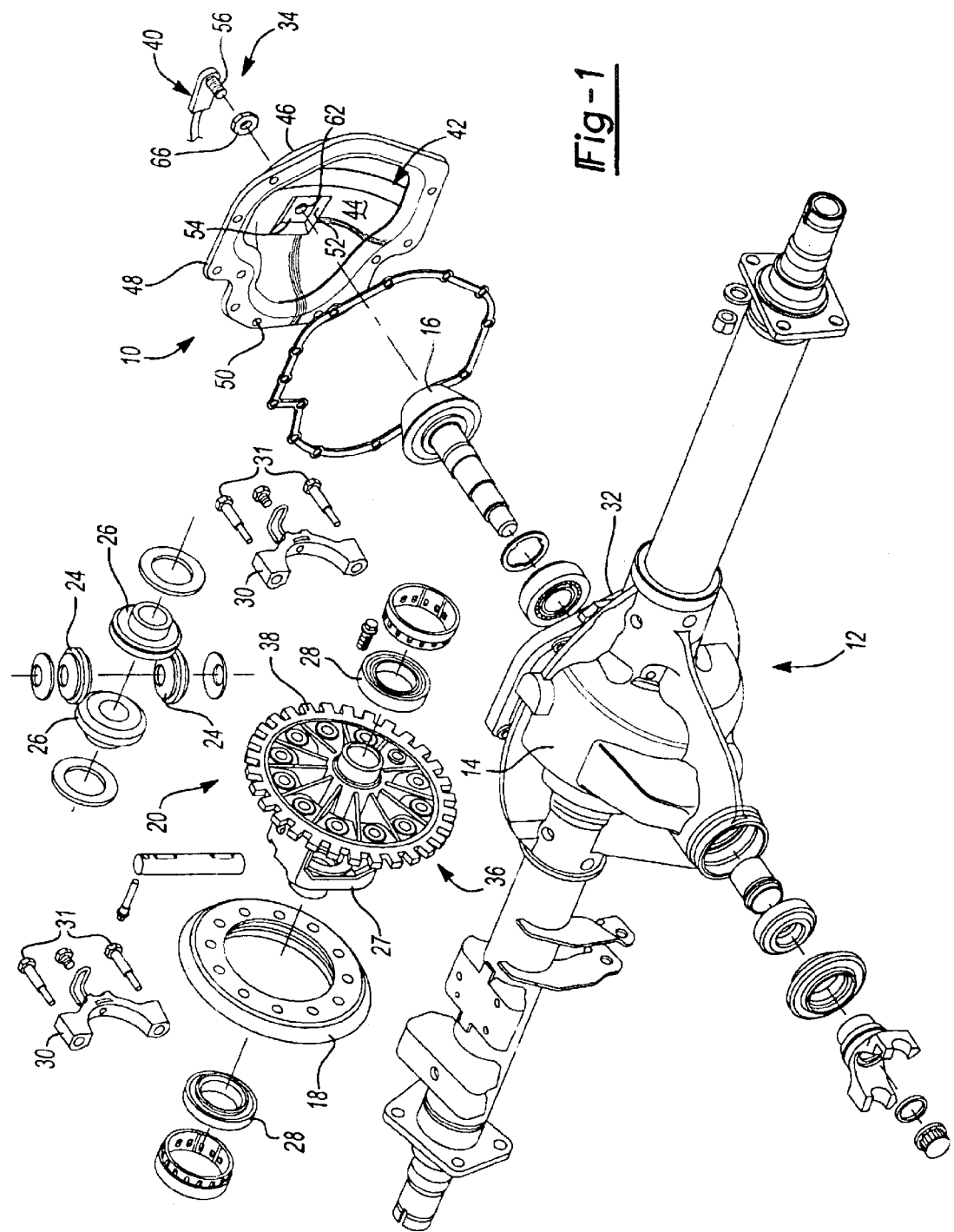
FIG. 1 is an exploded perspective view of an axle assembly equipped with a cover pan constructed in accordance with the teachings of the present invention.

With reference to the drawings, a differential cover pan for use with an anti-lock braking system sensor constructed in accordance with the teachings of an embodiment of the present invention is generally identified at reference numeral 10. The cover pan 10 is shown operatively associated with an exemplary drive axle assembly 12.

As particularly shown in FIG. 1, the drive axle assembly 12 is illustrated to generally include an axle carrier 14 for rotatably mounting a hypoid gear set including a pinion gear 16 and a ring gear 18 drivingly interconnected to a differential assembly 20. The differential assembly 20 functions to transfer power to a pair of axle shafts (not shown) while compensating for any difference in axle shaft speed rotation as may occur during a turn or other steering maneuver.

The differential assembly 20 includes a pair of pinion gears 24 and a pair of side gears 26 mounted in a differential housing 27. The side gears 26 are drivingly interconnected to the axle shafts thereby providing a power transmission path to a pair of vehicle wheels (not shown). To facilitate proper function of the axle assembly 12, the differential housing 27 is rotatably mounted on a pair of differential bearings 28. Furthermore, the axle carrier 14 includes two semicircular journals (not shown) for supporting approximately one-half of each of the differential bearings 28. Similarly, a pair of bearing caps 30 journally support the remaining approximate one-half of each of the differential bearings 28 when coupled to the axle carrier 14 via threaded fasteners 31. It should be appreciated that the axle carrier 14 further includes an opening 32 to provide access to the differential assembly 20.

The exemplary axle assembly 12 also includes anti-lock braking system components. As previously mentioned, the differential housing 27 rotates at a speed intermediate the rotation speed of axle shafts thereby providing an indication of vehicle speed. Accordingly, a differential housing speed sensing system 34 provides a signal indicative of the rotational speed of the differential housing 27 to an ABS control unit (not shown). The differential housing speed sensing system 34 includes a tone ring 36 having a plurality of teeth 38 and a sensor 40 positioned in close proximity thereto. Specifically, the tone ring 36 is coupled to the differential housing 27 and the sensor 40 is mounted to the differential cover pan of the present invention. As each tooth 38 passes by the sensor 40, a pulse is output to the ABS control unit. In this manner, the rotational speed of the differential housing 27 may be calculated and converted to an approximation of the vehicle speed.

Figure 2:
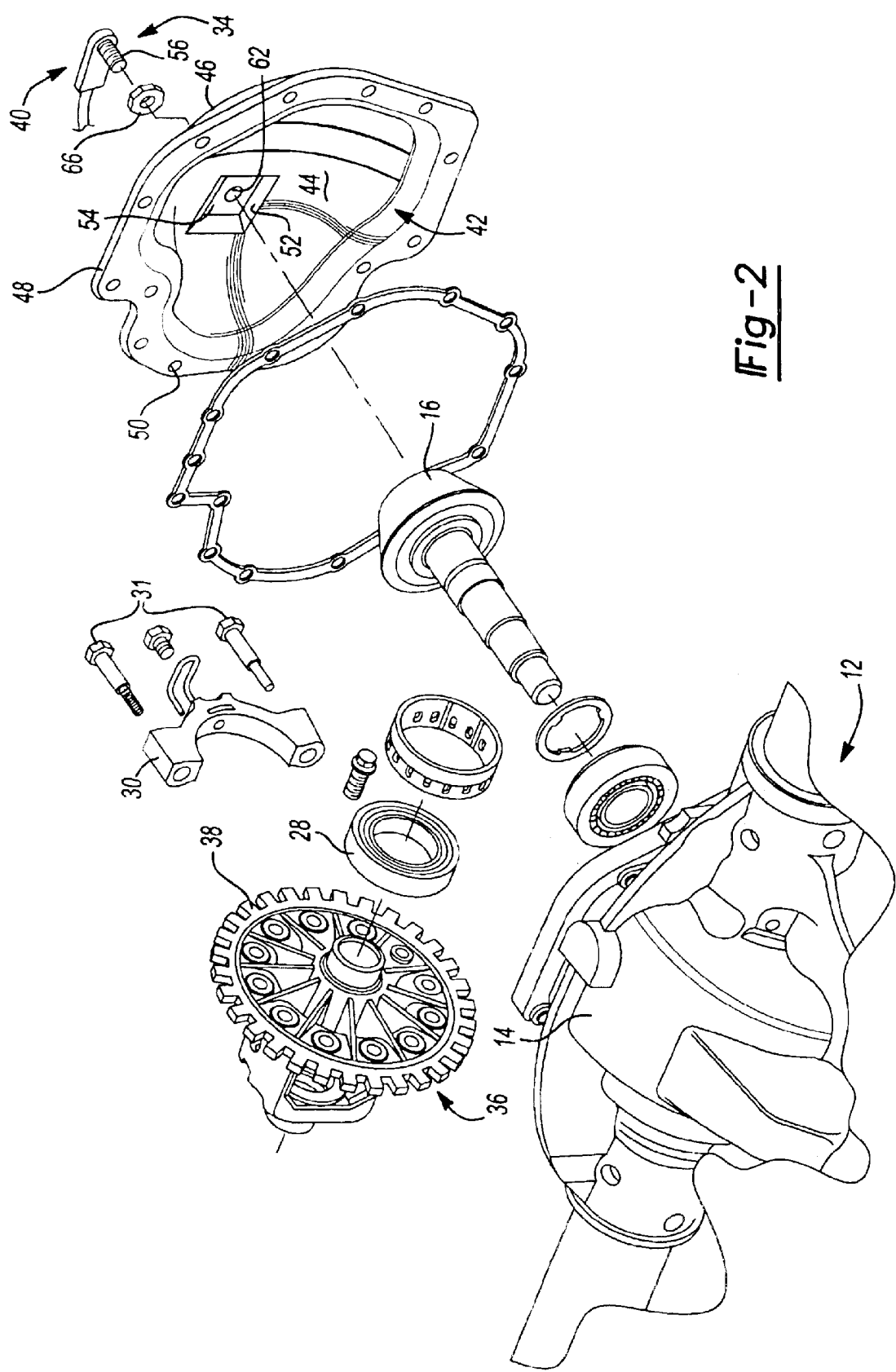
FIG. 2 is an enlarged, exploded perspective view similar to FIG. 1.
Figure 3:
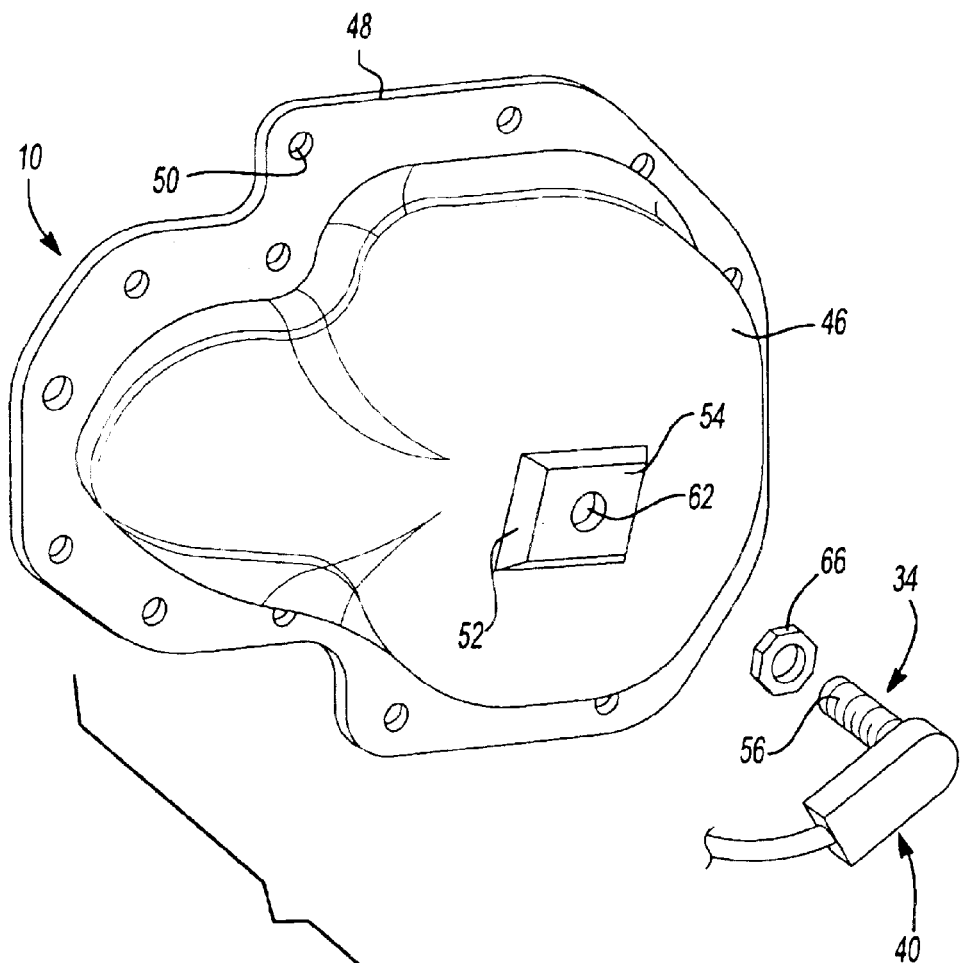
FIG. 3 is a perspective view of an embodiment of the cover pan of the present invention.

As best seen in FIGS. 2 and 3, the differential cover pan 10 is useful for providing service access to the components mounted within the axle carrier 14. The cover pan 10 is preferably stamped from a steel sheet and formed in the shape of a shell 42 having an inner surface 44 and an outer surface 46 terminating at a mounting flange 48. The mounting flange 48 includes a plurality of fastener apertures 50 extending therethrough for securing the cover pan 10 to the axle carrier 14 and enclosing the opening 32. In addition, the cover pan 10 includes a boss 52 having a generally planar mounting surface 54 for aligning and mounting the anti-lock braking system sensor 40 relative to the tone ring 36 mounted on the differential housing 27. Preferably, the ABS sensor 40 includes a threaded shank 56 for engagement with an attachment mechanism of the cover pan 10.

Figure 4:
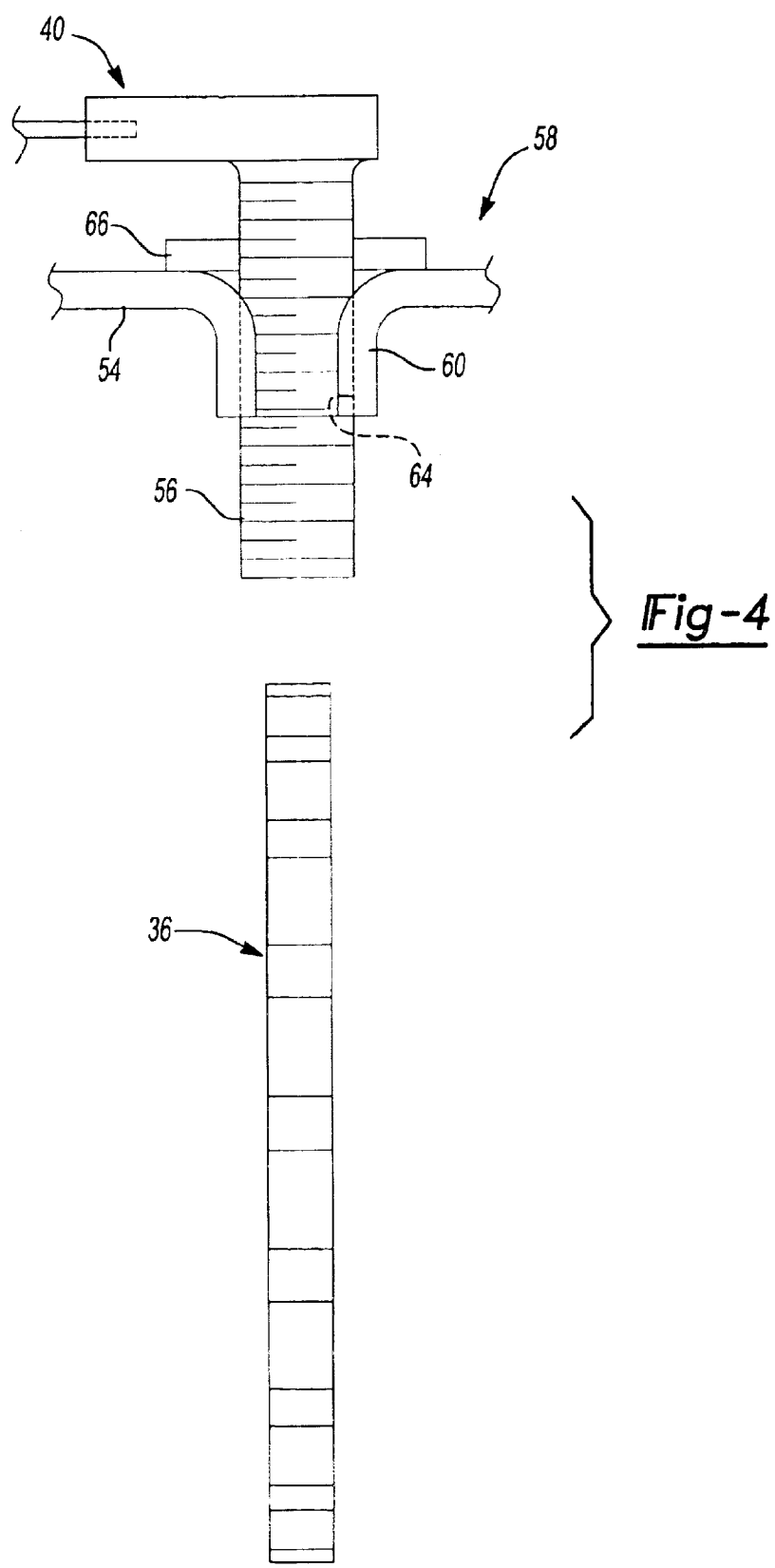
FIG. 4 is a cross sectional view of a first embodiment of the present invention.

As shown in FIG. 4, a first embodiment of an attachment mechanism 58 is operatively associated with the cover pan 10. Specifically, attachment mechanism 58 includes an extruded sidewall 60 inwardly extending from boss 52 to form an aperture 62. The sidewall 60 preferably includes an internal thread 64 for receiving the externally threaded shank 56 of the ABS sensor 40. One skilled in the art will appreciate that aperture 62, sidewall 60 and internal thread 64 may be constructed during a single stamping operation. Accordingly, the attachment mechanism 58 may be integrally formed within cover pan 10 in a simplified manner as compared to the carrier machining described earlier.

Assembly of the ABS sensor 40 to the cover pan 10 involves setting a desired clearance between the sensor 40 and the tone ring 36. Specifically, once the cover pan 10 has been fastened to the axle carrier 14, the ABS sensor 40 is threadingly engaged with the internal thread 64 and rotated until the sensor 40 contacts the tone ring 36. Based on the pitch of the external thread on shank 56, an operator rotates the sensor 40 in the opposite direction a certain number of turns to set the clearance. Once the proper clearance has been set, a lock nut 66 is torqued to prevent rotation of the sensor 40 relative to the cover pan 10.

Figure 5:
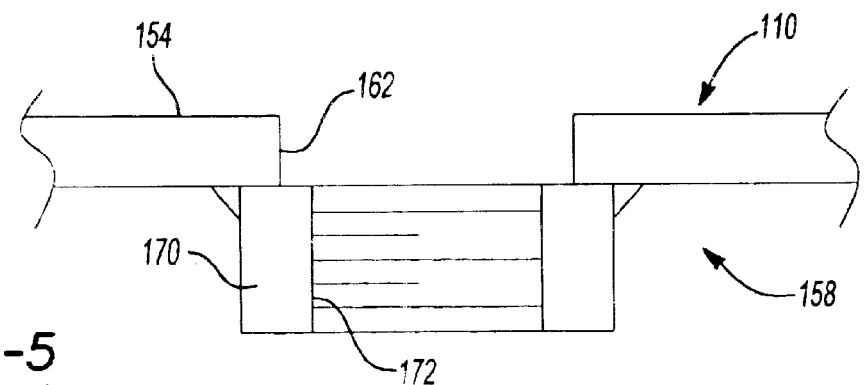
FIG. 5 is a cross sectional view of a second embodiment of the cover pan of the present invention.

Referring to FIG. 5, a second embodiment of the attachment mechanism is shown operatively associated with the cover pan depicted at reference numeral 110. It should be appreciated that the second embodiment of the attachment mechanism 158 functions substantially identically to the first embodiment previously described. Accordingly, like elements will be identified with numerals increased by 100 and only the differences in the two embodiments will be described in detail.

The second embodiment of the attachment mechanism 158 includes an aperture 162 preferably stamped or machined through the boss 152 for receipt of the ABS sensor. In addition, the attachment mechanism 158 includes a nut 170 having an internal thread 172 aligned with the aperture 162 and coupled to the cover pan 110 via a method commonly known in the art such as friction welding or resistance welding. Accordingly, the second embodiment of cover pan 110 functions similarly to first embodiment 10 by providing a generally planar mounting surface surrounding an internal thread.

Therefore, the cover pan 10 of the present invention provides both manufacturing and functional advantages over the prior art. Specifically, the cover pan 10 of the present invention eliminates a number of axle carrier machining operations required for mounting an ABS sensor to an axle assembly. Accordingly, cost is contained by reducing the number of machining operations and tools required to produce a finished drive axle with an anti-lock braking system.

The foregoing discussion discloses and describes merely exemplary embodiments of the present invention. One skilled in the art will readily recognize from such discussion, and from the accompanying drawings and claims, that various changes, modifications and variations may be made therein without departing from the spirit and scope of the invention as defined in the following claims.

What is claimed is:

1. A driving axle assembly comprising:
   an anti-lock braking system sensor;
   a carrier having an opening;
   a differential assembly including a housing rotatably mounted to said carrier; and
   a stamped cover pan mounted to said carrier to enclose said opening, said stamped cover pan including a boss having a generally planar mounting surface for aligning and mounting said anti-lock braking system sensor and an aperture therethrough for receiving said anti-lock braking system sensor, said anti-lock braking system sensor being adjustably coupled to said cover pan such that a predetermined clearance between said differential assembly housing and said anti-lock braking system sensor may be obtained.

2. The driving axle assembly of claim 1 wherein said cover pan includes an inwardly extending extrusion having an internal thread for interconnecting said anti-lock braking system sensor and said cover pan.

3. The driving axle assembly of claim 2 further including a lock nut for restricting rotation of said anti-lock braking system sensor relative to said cover pan.

4. The driving axle assembly of claim 3 wherein said differential assembly includes a tone ring mounted to said differential housing.

5. The driving axle assembly of claim 1 further including a nut coupled to an inner surface of said cover pan, said nut having an internal thread for interconnecting said cover pan and said anti-lock braking system sensor.

6. The driving axle assembly of claim 5 wherein said differential assembly includes a tone ring and wherein said predetermined clearance is set between said anti-lock braking system sensor and said tone ring.

7. The driving axle assembly of claim 6 where in s aid clearance is set by rotating said anti-lock braking system sensor relative to said cover pan.

8. The driving axle assembly of claim 7 wherein said clearance is maintained by interconnecting said anti-lock braking system sensor and said cover pan via a lock nut.

9. The driving axle assembly of claim 8 wherein said generally planar mounting surface provides a seat for said lock nut.

10. A cover pan for a driving axle equipped with an anti-lock braking system sensor, the axle having a carrier for rotatably mounting a differential assembly drivingly connected to a pair of axle shafts, the carrier having an opening for access to the differential assembly, the differential assembly having a housing and a tone ring coupled thereto, the cover pan comprising:
   a stamped shell having an inner surface and an outer surface terminating at a radially extending flange, said flange adapted for enclosing the opening and coupling to the carrier;

a boss protruding from said shell wherein said boss includes a generally planar mounting surface for aligning and mounting said anti-lock braking system sensor and an aperture extending therethrough for receiving said anti-lock braking system sensor; said aperture adapted for receipt of the anti-lock braking system sensor; and an attachment mechanism adapted to couple the anti-lock braking sensor to said cover pan, said attachment mechanism enabling adjustability of said anti-lock braking system sensor for a predetermined clearance.

11. The cover pan of claim 10 wherein said attachment mechanism includes an extrusion inwardly extending from said generally planar mounting surface, said extrusion including a sidewall defining said aperture.

12. The cover pan of claim 11 wherein said sidewall includes an internal thread.

13. The cover pan of claim 12 wherein said attachment mechanism further includes a lock nut adapted to restricting rotation of the anti-lock braking system sensor relative to said cover pan.

14. The cover pan of claim 10 wherein said attachment mechanism includes a nut having an internal thread positioned in alignment with said aperture and coupled to said cover pan.

15. The cover pan of claim 14 wherein said attachment mechanism further includes a lock nut adapted to restrict the rotation of the anti-lock braking system sensor relative to said cover pan.

\* \* \* \* \*